(12) United States Patent
Huang

(10) Patent No.: US 11,112,583 B2
(45) Date of Patent: Sep. 7, 2021

(54) CAMERA LENS ASSEMBLY AND CAMERA DEVICE COMPRISING THE CAMERA LENS ASSEMBLY

(71) Applicant: Zhejiang Sunny Optical Co., Ltd, Zhejiang Province (CN)

(72) Inventor: Lin Huang, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 62 days.

(21) Appl. No.: 16/076,283

(22) PCT Filed: Jul. 19, 2017

(86) PCT No.: PCT/CN2017/093503
§ 371 (c)(1),
(2) Date: Aug. 7, 2018

(87) PCT Pub. No.: WO2018/176695
PCT Pub. Date: Oct. 4, 2018

(65) Prior Publication Data
US 2021/0033820 A1  Feb. 4, 2021

(30) Foreign Application Priority Data

Mar. 27, 2017 (CN) .......................... 201710187519.9
Mar. 27, 2017 (CN) .......................... 201720303187.1

(51) Int. Cl.
G02B 13/00 (2006.01)
G02B 9/62 (2006.01)
G02B 27/00 (2006.01)

(52) U.S. Cl.
CPC ........... *G02B 13/0045* (2013.01); *G02B 9/62* (2013.01); *G02B 27/0025* (2013.01)

(58) Field of Classification Search
CPC .. G02B 13/0045; G02B 9/62; G02B 27/0025; G02B 13/04
(Continued)

(56) References Cited

U.S. PATENT DOCUMENTS 9,557,534 B1 * 1/2017 Liao ................... G02B 13/0045
10,345,555 B2 * 7/2019 Dai ..................... G02B 13/0045
(Continued)

FOREIGN PATENT DOCUMENTS

CN  103605200 A   2/2014
CN  105204144 A   12/2015
(Continued)

OTHER PUBLICATIONS

International Search Report issued in PCT/CN/2017/093503, dated Nov. 29, 2017.
(Continued)

*Primary Examiner* — Mohammed A Hasan
(74) *Attorney, Agent, or Firm* — Hauptman Ham, LLP

(57) ABSTRACT

The present disclosure provides a camera lens assembly, the camera lens assembly including sequentially, from an object side to an image side along an optical axis, a first lens having a negative refractive power, wherein an image-side surface of the first lens is a concave surface; a second lens, wherein an image-side surface of the second lens is a convex surface; a third lens; a fourth lens having a negative refractive power; and at least one subsequent lens. An effective radius DT21 of an object-side surface of the second lens and an effective radius DT42 of an image-side surface of the fourth lens satisfy: 0.5<DT21/DT42<1.

22 Claims, 10 Drawing Sheets

(58) Field of Classification Search
USPC .......................................................... 359/713
See application file for complete search history.

(56) References Cited

U.S. PATENT DOCUMENTS

2016/0341928 A1    11/2016  Liu et al.
2020/0257081 A1*   8/2020   Huang ................. G02B 13/146

FOREIGN PATENT DOCUMENTS

| | | |
|---|---|---|
| CN | 205049802 U | 2/2016 |
| CN | 106019535 A | 10/2016 |
| CN | 106168698 A | 11/2016 |
| CN | 206039008 U | 3/2017 |
| CN | 106772957 A | 5/2017 |
| CN | 206671656 U | 11/2017 |
| JP | 2011175198 A | 9/2011 |

OTHER PUBLICATIONS

Office Action issued in corresponding Chinese Patent Application No. 201710187519.9, dated Sep. 9, 2019.

* cited by examiner

CAMERA LENS ASSEMBLY AND CAMERA DEVICE COMPRISING THE CAMERA LENS ASSEMBLY

CROSS-REFERENCE TO RELATED APPLICATIONS

This application is a US National Stage Application under 35 USC § 371 of PCT/CN2017/093503, filed Jul. 19, 2017, claims the priorities and rights from Chinese Patent Application No. 201710187519.9 filed with the State Intellectual Property Office of China (SIPO) on Mar. 27, 2017 and Chinese Patent Application No. 201720303187.1 filed with the SIPO on Mar. 27, 2017, the disclosures of which are hereby incorporated by reference in their entireties.

TECHNICAL FIELD

The present disclosure relates to a camera lens assembly, and specifically relates to a camera lens assembly including multiple lenses. The present disclosure also relates to a camera device equipped with the above-mentioned camera lens assembly.

BACKGROUND

As the science and technology develops, portable electronic products are gradually rising. In particular, portable electronic products with camera functions are increasingly liked by people. For a camera device mounted on a moving equipment (especially a vehicle-mounted camera device, a surveillance camera device and a camera device for a unmanned aerial vehicle, etc.), its optical system tends to be wide-angle and have higher pixels, and is required to ensure a good image quality even when a temperature difference is large. In order to satisfy this demand, a camera lens assembly also needs to further have a high image quality, a wide angle, and high brightness.

SUMMARY

The present disclosure aims to provide a miniaturized and wide-angle athermal camera lens assembly having a high image quality.

According to one aspect, the present disclosure provides a camera lens assembly. The camera lens assembly may have multiple lenses provided sequentially from an object side to an image side along an optical axis. In exemplary implementations of the present disclosure, the camera lens assembly, for example, may include: a first lens having a negative refractive power, wherein an image-side surface of the first lens is a concave surface; a second lens having a refractive power, wherein an image-side surface of the second lens is a convex surface; a third lens having a refractive power; a fourth lens having a negative refractive power; and at least one subsequent lens. The lenses are sequentially provided along the optical axis from the object side to the image side.

According to another aspect, the present disclosure provides a camera lens assembly. The camera lens assembly may be sequentially provided with, from an object side to an image side along an optical axis, a first lens, a second lens, a third lens, a fourth lens, a fifth lens, and a sixth lens. The first lens may have a negative refractive power, and an image-side surface of the first lens may be a concave surface; an image-side surface of the second lens may be a convex surface; and a material of the third lens may be glass and the fourth lens may have a negative refractive power.

According to implementations of the present disclosure, an effective radius DT21 of an object-side surface of the second lens and an effective radius DT42 of an image-side surface of the fourth lens may satisfy: 0.5<DT21/DT42<1, for example, 0.632≤DT21/DT42≤0.953.

According to the implementations of the present disclosure, an effective focal length f1 of the first lens and an effective focal length f4 of the fourth lens may satisfy: 1<f1/f4<1.8, for example, 1.433≤f1/f4≤1.787.

According to the implementations of the present disclosure, an influencing rate of a unit temperature of the third lens to a unit refractive index of the third lens may satisfy: $|dn3/dt|<10^{-5}$, wherein a refractive index of the third lens is n3, and a temperature of the third lens is t.

According to the implementations of the present disclosure, half of a maximal field-of-view HFOV of the camera lens assembly and a total effective focal length f of the camera lens assembly may satisfy: 5.4 mm<tan(HFOV)*f<10 mm, for example, 5.493 mm≤tan(HFOV)*f≤8.061 mm.

According to the implementations of the present disclosure, a maximum angle CRAmax of an incident ray corresponding to an image height of the camera lens assembly on an electronic photosensitive assembly should satisfy: CRAmax<21°, for example, CRAmax≤20.003°.

According to the implementations of the present disclosure, a center thickness CT4 of the fourth lens on the optical axis and a center thickness CT5 of the fifth lens on the optical axis may satisfy: CT4/CT5<0.5, for example, CT4/CT5≤0.262.

According to the implementations of the present disclosure, a center thickness CT2 of the second lens on the optical axis, a center thickness CT5 of the fifth lens on the optical axis and an axial distance TTL from an object-side surface of the first lens to an image plane of the camera lens assembly may satisfy: (CT2+CT5)/TTL<0.4, for example, (CT2+CT5)/TTL≤0.281.

According to the implementations of the present disclosure, an axial spacing distance T23 between the second lens and the third lens, an axial spacing distance T34 between the third lens and the fourth lens, an axial spacing distance T45 between the fourth lens and the fifth lens and the axial distance TTL from the object-side surface of the first lens to the image plane may satisfy: 0.04<(T23+T34+T45)/TTL<0.12, for example, 0.048≤(T23+T34+T45)/TTL≤0.103.

According to the implementations of the present disclosure, an effective radius DT11 of the object-side surface of the first lens and an effective radius DT62 of an image-side surface of the sixth lens may satisfy: 0.8<DT11/DT62<1.3, for example, 0.959≤DT11/DT62≤1.167.

According to the implementations of the present disclosure, an axial spacing distance T12 between the first lens and the second lens and an axial spacing distance T56 between the fifth lens and the sixth lens may satisfy: 1.1<T12/T56<1.9, for example, 1.199≤T12/T56≤1.862.

According to the implementations of the present disclosure, a radius of curvature R2 of the image-side surface of the first lens and a radius of curvature R11 of an object-side surface of the sixth lens may satisfy: 0.8<R2/R11<1.8, for example, 0.875≤R2/R11≤1.688.

According to the implementations of the present disclosure, the effective radius DT62 of the image-side surface of the sixth lens and half of a diagonal length ImgH of an effective pixel area of an electronic photosensitive element may satisfy: 2.5<DT62/ImgH<3.5, for example, 2.5≤DT62/ImgH≤3.5.

According to another aspect of the present disclosure, a camera device provided with the camera lens assembly as described above is also provided.

BRIEF DESCRIPTION OF THE DRAWINGS

The above and other advantages of implementations of the present disclosure will become apparent from the detailed description given with reference to the following accompanying drawings, which are intended to illustrate the exemplary implementations of the present disclosure rather than limit them. In the accompanying drawings.

DETAILED DESCRIPTION OF EMBODIMENTS

Figure 1:
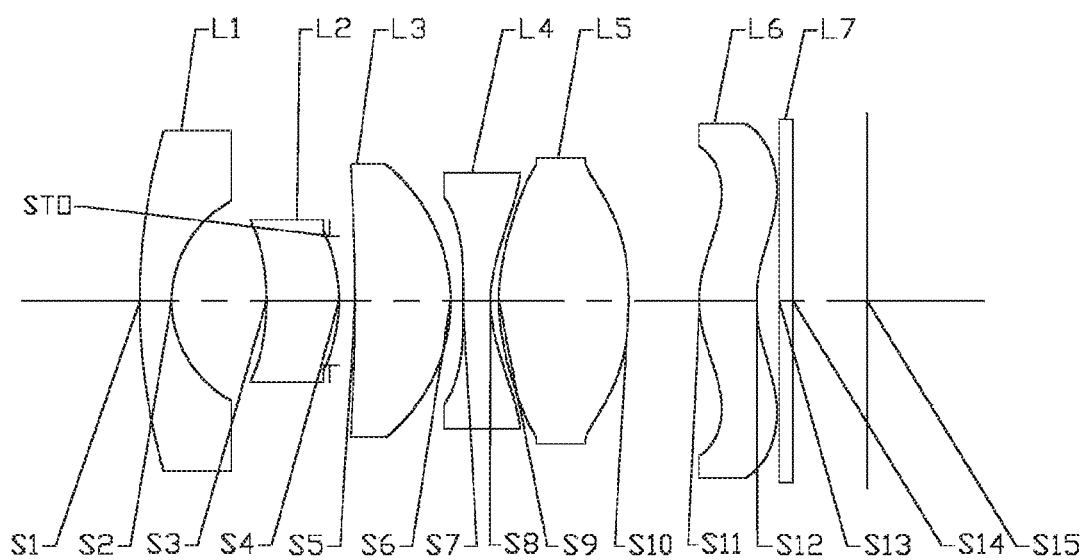
FIG. 1 is a schematic structural diagram illustrating a camera lens assembly according to Embodiment 1 of the present disclosure.

For a better understanding of the present disclosure, various aspects of the present disclosure will be described in more detail with reference to the accompanying drawings. It should be understood that the detailed description is merely illustrative of exemplary implementations of the present disclosure and is not intended to limit the scope of the present disclosure in any way. Throughout the specification, the same reference numerals refer to the same elements. The expression "and/or" includes any and all combinations of one or more of the associated listed items.

It should be noted that in the specification, the expressions of the first, the second, the third, etc. are only used to distinguish one feature from another, rather than represent any limitations to the features. Thus, the first lens discussed below may also be referred to as the second lens or the third lens without departing from the teachings of the present disclosure.

In the accompanying drawings, the thickness, size and shape of the lens have been slightly exaggerated for the convenience of explanation. However, it should be understood that the sizes of the components are not limited by the accompanying drawings, but may be appropriately adjusted within a certain range. Specifically, shapes of spherical surfaces or aspheric surfaces shown in the accompanying drawings are shown by way of examples. That is, shapes of spherical surfaces or aspheric surfaces are not limited to the shapes of the spherical surfaces or the aspheric surfaces shown in the accompanying drawings. The accompanying drawings are merely illustrative and not strictly drawn to scale.

In addition, the paraxial area refers to an area near the optical axis. The first lens is the lens closest to the object and the sixth lens is the lens closest to the photosensitive element. In this text, the surface closest to the object in each lens is referred to as the object-side surface, and the surface closest to the image plane in each lens is referred to as the image-side surface.

It should be further understood that the terms "comprising," "including," "having" and variants thereof, when used in this specification, specify the presence of stated features, entireties, steps, operations, elements and/or components, but do not exclude the presence or addition of one or more other features, entireties, steps, operations, elements, components and/or combinations thereof. In addition, expressions, such as "at least one of," when preceding a list of features, modify the entire list of features rather than an individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

Features, principles and other aspects of the present disclosure will be described below in detail.

The present disclosure provides a camera lens assembly. The camera lens assembly according to the exemplary implementations of the present disclosure may be sequentially provided with, from an object side to an image side along an optical axis, a first lens, a second lens, a third lens, a fourth lens, at least one subsequent lens, and a photosensitive element. The camera lens assembly may have a total effective focal length f.

In the exemplary implementations, the first lens may have a negative refractive power, and an image-side surface of the first lens may be a concave surface; an image-side surface of the second lens may be a convex surface; and a material of the third lens may be glass and the fourth lens may have a negative refractive power. The third lens made of the glass material can reduce the effect of the temperature difference on the image effect of the lens assembly, thereby reducing the thermal difference.

In the exemplary implementations, the at least one subsequent lens may include a fifth lens disposed on an image-side surface of the fourth lens along the optical axis and a sixth lens disposed on an image-side surface of the fifth lens along the optical axis.

In the exemplary implementations, an effective focal length f1 of the first lens and an effective focal length f4 of the fourth lens may satisfy: 1<f1/f4<1.8, and more specifically, satisfy: 1.433≤f1/f4≤1.787. By properly configuring the refractive power and the surface type, the image quality of the lens assembly may be effectively improved, and high-pixel functions and wide-angle functions may be realized. An effective radius DT11 of an object-side surface of the first lens and an effective radius DT62 of an image-side surface of the sixth lens may be set to satisfy: 0.8<DT11/DT62<1.3, and more specifically, satisfy: 0.959≤DT11/DT62≤1.167, to compress the lateral size of the camera lens assembly to achieve an effect of miniaturization of the lens assembly. In addition, a radius of curvature R2 of the image-side surface of the first lens and a radius of curvature R11 of an object-side surface of the sixth lens may satisfy: 0.8<R2/R11<1.8, and more specifically, satisfy: 0.875≤R2/R11≤1.688. By properly configuring the radius of curvature and the shape of the lens, the relative illumination can be improved, so that the camera lens assembly has a high image quality.

In the exemplary implementations, an axial spacing distance T12 between the first lens and the second lens and an axial spacing distance T56 between the fifth lens and the sixth lens may satisfy: 1.1<T12/T56<1.9, and more specifically, satisfy: 1.199≤T12/T56≤1.862. By properly arranging the position of the lens, the lens can be wide-angled.

In the exemplary implementations, an effective radius DT21 of an object-side surface of the second lens and an effective radius DT42 of the image-side surface of the fourth lens may satisfy: 0.5<DT21/DT42<1, and more specifically, satisfy: 0.632≤DT21/DT42≤0.953. By properly configuring the size of the lens, a good assembly technology can be realized.

In the exemplary implementations, a center thickness CT2 of the second lens on the optical axis, a center thickness CT5 of the fifth lens on the optical axis and an axial distance TTL from the object-side surface of the first lens to an image plane of the camera lens assembly may satisfy: (CT2+CT5)/TTL<0.4, and more specifically, satisfy: (CT2+CT5)/TTL<0.281. The proper configuration of the size of the lens may achieve a good process effect.

In the exemplary implementations, an axial spacing distance T23 between the second lens and the third lens, an axial spacing distance T34 between the third lens and the fourth lens, an axial spacing distance T45 between the fourth lens and the fifth lens and the axial distance TTL from the object-side surface of the first lens to the image plane may satisfy: 0.04<(T23+T34+T45)/TTL<0.12, and more specifically, satisfy: 0.048≤(T23+T34+T45)/TTL≤0.103. By making the lenses have a compact structural layout, a good assembly effect is achieved.

In the exemplary implementations, an influencing rate of a unit temperature of the third lens to a unit refractive index of the third lens may be configured to satisfy: $|dn3/dt|<10^{-5}$, wherein a refractive index of the third lens is n3, and a temperature of the third lens is t. The third lens with this setting can reduce an influence of the temperature on the image surface drift of the optical system.

In the exemplary implementations, a center thickness CT4 of the fourth lens on the optical axis and the center thickness CT5 of the fifth lens on the optical axis may satisfy: CT4/CT5<0.5, and more specifically, satisfy: CT4/CT5≤0.262. By properly setting the center thicknesses of the fourth lens and the fifth lens on the optical axis, the light angle can be alleviated, the aberration can be reduced, thus improving the image quality.

In the exemplary implementations, the effective radius DT62 of the image-side surface of the sixth lens and half of a diagonal length ImgH of an effective pixel area of an electronic photosensitive element may satisfy: 2.5<DT62/ImgH<3.5, and more specifically, satisfy: 2.5≤DT62/ImgH≤3.5, to compress the lateral size of the lens assembly, making the lens assembly miniaturized.

In the exemplary implementations, half of a maximal field-of-view HFOV of the camera lens assembly and the total effective focal length f of the camera lens assembly may satisfy: 5.4 mm<tan(HFOV)*f<10 mm, and more specifically, satisfy: 5.493 mm≤an(HFOV)*f≤8.061 mm By adjusting the maximal field-of-view of the camera lens assembly and the total effective focal length of the camera lens assembly, it is possible to ensure the wide angle of the lens assembly and achieve a large image plane and a high-pixel effect.

In the exemplary implementations, a maximum angle CRAmax of an incident ray corresponding to an image height of the camera lens assembly on an electronic photosensitive assembly should satisfy: CRAmax<21°, for example, CRAmax≤20.003°, to improve an acceptance efficiency and a deviation of light on a chip, improve the relative illumination of the camera lens assembly and improve the color deviation, thereby obtaining a high image quality.

The present disclosure also provides a camera device. The camera device may include the camera lens assembly as described above.

The camera lens assembly according to the above implementations of the present disclosure may use multiple lenses, for example, six lenses as described in the present disclosure. However, it should be understood that this is only an example rather than a limitation. By properly setting the refractive power, the center thickness, the surface type, and the material of each lens and the axial spacing distances between the lenses, etc., it is possible to provide a miniaturized, and wide-angle athermal camera lens assembly having a high image quality. In the implementations of the present disclosure, at least one of the mirror surfaces of the lenses is an aspheric mirror surface. The characteristic of the aspheric lens is: from the center of the lens to the periphery, the curvature is continuously changing. Unlike the spherical lens with a constant curvature from the center of the lens to the periphery, the aspheric lens has a better radius-of-curvature characteristic, and has advantages of improving a distortion aberration and improving an astigmatic aberration, which can make the visual field larger and more realistic. Using the aspheric lens, aberrations occurring at the time of imaging can be eliminated as much as possible, thereby improving the image quality.

However, it should be understood by those skilled in the art that the various results and advantages described below may be obtained by changing the number of the lenses constituting the lens assembly without departing from the technical solution claimed by the present disclosure. For example, although six lenses are described as an example in the first implementation, the camera lens assembly is not limited to include six lenses. If desired, the camera lens assembly may also include other numbers of lenses.

Specific embodiments of the camera lens assembly that may be applied to the above implementations are further described below with reference to FIG. 1 to FIG. 10D.

Embodiment 1

Embodiment 1 of the camera lens assembly of the above implementations of the present disclosure is described below with reference to FIG. 1 to FIG. 2D.

As shown in FIG. 1, the camera lens assembly according to Embodiment 1 includes a first lens L1 having an object-side surface S1 and an image-side surface S2, a second lens L2 having an object-side surface S3 and an image-side surface S4, a third lens L3 having an object-side surface S5 and an image-side surface S6, a fourth lens L4 having an object-side surface S7 and an image-side surface S8, a fifth lens L5 having an object-side surface S9 and an image-side surface S10, and a sixth lens L6 having an object-side surface S11 and an image-side surface S12. In this embodiment, the first lens may have a negative refractive power, and the image-side surface of the first lens may be a concave surface; the second lens may have a positive refractive power or a negative refractive power, and the image-side surface of the second lens may be a convex surface; the third lens may have a positive refractive power or a negative refractive power, and a material of the third lens may be glass; and the fourth lens may have a negative refractive power. The camera lens assembly may also include a diaphragm (not shown) and an optical filter L7 having an object-side surface S13 and an image-side surface S14 for filtering infrared light. In the camera lens assembly of the present embodiment, an aperture STO for adjusting the amount of light admitted may also be provided between the third lens L3 and the fourth lens L4. Light from an object passes through the surfaces S1 to S14 sequentially and is finally imaged on an image plane S15.

Table 1 below shows the effective focal lengths f1-f6 of the lenses, the total effective focal length f of the camera lens assembly, the half of the diagonal length ImgH of the effective pixel area of the electronic photosensitive element, the half of the maximal field-of-view HFOV of the camera lens assembly, the f-number Fno of the camera lens assembly and the total track length TTL of the camera lens assembly in Embodiment 1.

Referring to Table 1, the effective focal length f1 of the first lens and the effective focal length f4 of the fourth lens satisfy: f1/f4=1.625. The half of the maximal field-of-view HFOV of the camera lens assembly and the total effective focal length f of the camera lens assembly satisfy: tan (HFOV)*f=8.061 mm

TABLE 1

| f(mm) | 3.557 | ImgH(mm) | 4.10 |
|---|---|---|---|
| f1(mm) | −6.362 | HFOV (deg) | 66.188 |
| f2(mm) | 10.964 | Fno | 2.018 |
| f3(mm) | 5.457 | TTL(mm) | 16.003 |
| f4(mm) | −3.916 | | |
| f5(mm) | 5.453 | | |
| f6(mm) | 16.989 | | |

Table 2 shows the surface type, the radius of curvature, the thickness, the material and the conic coefficient of each lens in this Embodiment 1.

TABLE 2

| surface number | surface type | radius of curvature | thickness | material | conic coefficient |
|---|---|---|---|---|---|
| OBJ | spherical | infinite | infinite | | |
| S1 | spherical | 13.5744 | 0.7000 | 1.489/70.42 | |
| S2 | spherical | 2.4872 | 2.0855 | | |
| S3 | aspheric | −5.7754 | 1.5937 | 1.668/20.37 | 3.9151 |
| S4 | aspheric | −3.5818 | −0.2055 | | −0.7980 |
| STO | spherical | infinite | 0.5596 | | |
| S5 | spherical | −46.4346 | 2.1047 | 1.758/52.33 | |
| S6 | spherical | −3.8709 | 0.2721 | | |
| S7 | aspheric | 381.1331 | 0.6000 | 1.668/20.37 | 5.0000 |
| S8 | aspheric | 2.5906 | 0.1861 | | −6.0433 |
| S9 | aspheric | 4.0901 | 2.8609 | 1.547/56.11 | −8.2251 |
| S10 | aspheric | −8.2359 | 1.5532 | | 3.4331 |
| S11 | aspheric | 2.6496 | 1.2564 | 1.547/56.11 | −3.9336 |
| S12 | aspheric | 3.0881 | 0.5000 | | −1.1139 |
| S13 | spherical | infinite | 0.3000 | 1.517/64.17 | |
| S14 | spherical | infinite | 1.6362 | | |
| S15 | spherical | infinite | | | |

Referring to Table 2, the center thickness CT2 of the second lens on the optical axis, the center thickness CT5 of the fifth lens on the optical axis and the axial distance TTL from the object-side surface of the first lens to the image plane of the camera lens assembly satisfy: (CT2+CT5)/TTL=0.278. The center thickness CT4 of the fourth lens on the optical axis and the center thickness CT5 of the fifth lens on the optical axis satisfy: CT4/CT5=0.210. The axial spacing distance T12 between the first lens and the second lens and the axial spacing distance T56 between the fifth lens and the sixth lens satisfy: T12/T56=1.343. The radius of curvature R2 of the image-side surface of the first lens and the radius of curvature R11 of the object-side surface of the sixth lens satisfy: R2/R11=0.939. The axial spacing distance T23 between the second lens and the third lens, the axial spacing distance T34 between the third lens and the fourth lens, the axial spacing distance T45 between the fourth lens and the fifth lens and the axial distance TTL from the object-side surface of the first lens to the image plane satisfy: (T23+T34+T45)/TTL=0.051.

Table 3 shows the higher-order coefficients $A_4$, $A_6$, $A_8$, $A_{10}$, $A_{12}$, $A_{14}$ and $A_{16}$ applicable to aspheric surfaces of S1-S12 of the lenses in Embodiment 1.

TABLE 3

| surface number | A4 | A6 | A8 | A10 | A12 | A14 | A16 |
|---|---|---|---|---|---|---|---|
| S3 | −4.6781E−03 | −4.1231E−04 | 9.2000E−04 | −9.2728E−04 | 4.9165E−04 | −1.2761E−04 | 1.3164E−05 |
| S4 | −1.1572E−03 | 1.5106E−03 | −2.2392E−03 | 1.6510E−03 | −5.6940E−04 | 6.7146E−05 | 3.3438E−06 |

TABLE 3-continued

| surface number | A4 | A6 | A8 | A10 | A12 | A14 | A16 |
|---|---|---|---|---|---|---|---|
| S7 | −3.0888E−02 | 9.1987E−03 | −2.7940E−03 | 5.6396E−04 | −7.0973E−05 | 5.0144E−06 | −1.7184E−07 |
| S8 | −1.0477E−02 | 5.8437E−03 | −2.0009E−03 | 4.0271E−04 | −4.8319E−05 | 3.1605E−06 | −8.7873E−08 |
| S9 | −4.3759E−03 | 3.5385E−03 | −1.0837E−03 | 1.9124E−04 | −1.9468E−05 | 1.0797E−06 | −2.5195E−08 |
| S10 | −1.5960E−02 | 3.2813E−03 | −6.1495E−04 | 9.6831E−05 | −1.0225E−05 | 6.3945E−07 | −1.5899E−08 |
| S11 | 2.2907E−04 | −2.8331E−03 | 2.6129E−04 | 1.3143E−05 | −4.6734E−06 | 3.8223E−07 | −1.1627E−08 |
| S12 | −1.1147E−02 | −2.1755E−03 | 5.0928E−04 | −5.4263E−05 | 3.4242E−06 | −1.2269E−07 | 1.8333E−09 |

Referring to Table 1 to Table 3, the effective radius DT11 of the object-side surface of the first lens and the effective radius DT62 of the image-side surface of the sixth lens satisfy: DT11/DT62=0.959. The effective radius DT21 of the object-side surface of the second lens and the effective radius DT42 of the image-side surface of the fourth lens satisfy: DT21/DT42=0.632. The effective radius DT62 of the image-side surface of the sixth lens and the half of the diagonal length ImgH of the effective pixel area of the electronic photosensitive element satisfy: DT62/ImgH=3.382.

In addition, in Embodiment 1, the influencing rate of the unit temperature of the third lens to the unit refractive index of the third lens satisfy: |dn3/dt|=1.19E-6. The maximum angle CRAmax of the incident ray corresponding to the image height of the camera lens assembly on the electronic photosensitive assembly is 20.003°.

Figure 2A:
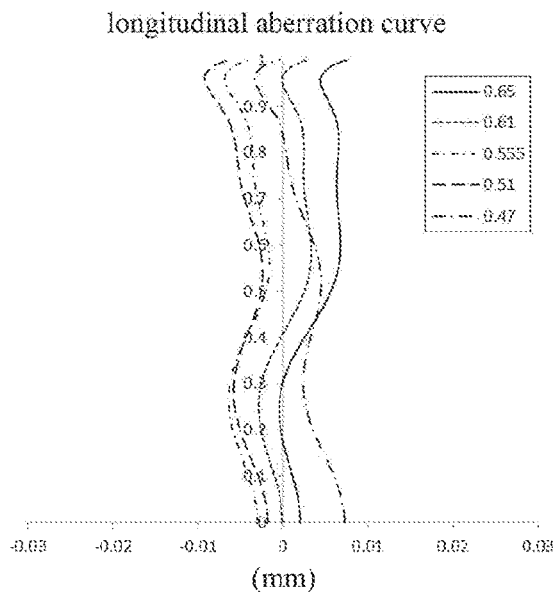
FIG. 2A illustrates a longitudinal aberration curve of the camera lens assembly according to Embodiment 1.
Figure 2B:
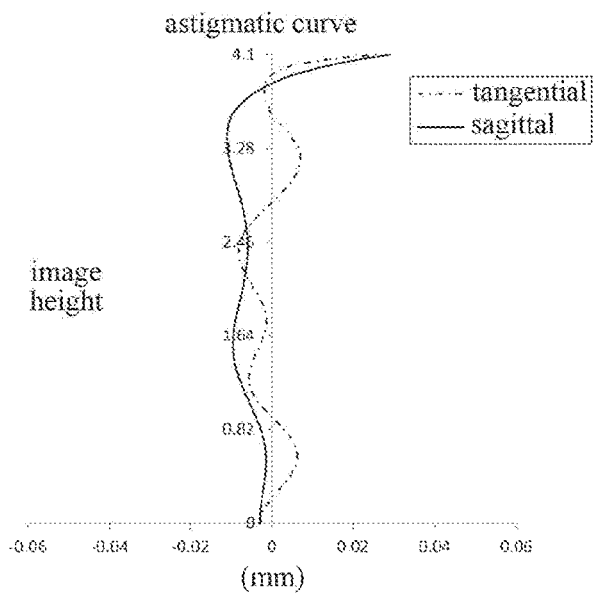
FIG. 2B illustrates an astigmatic curve of the camera lens assembly according to Embodiment 1.
Figure 2C:
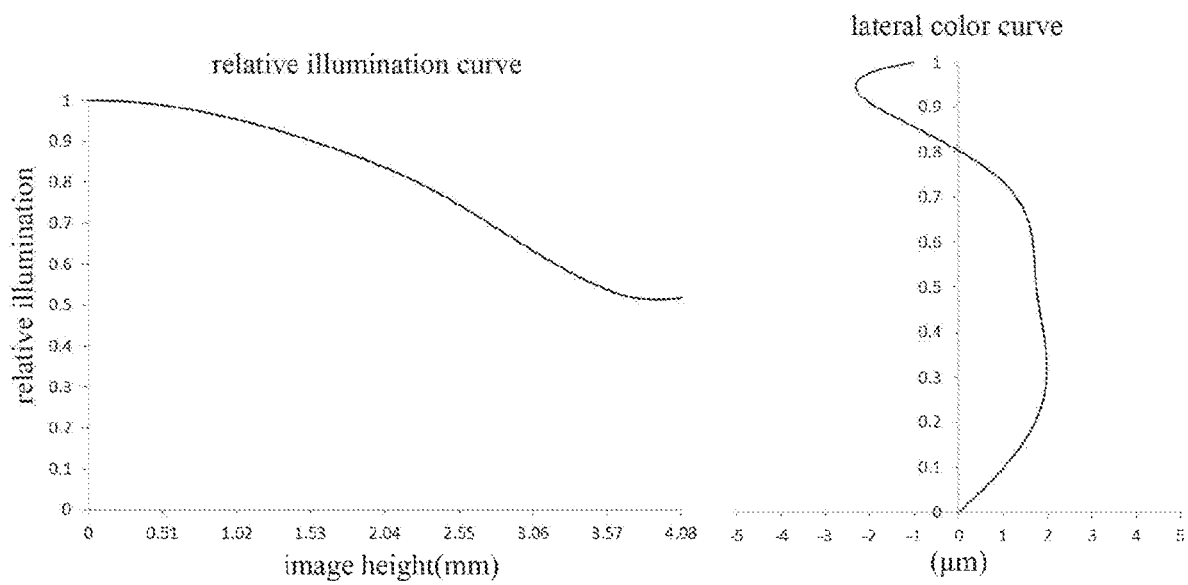
FIG. 2C illustrates a relative illumination curve of the camera lens assembly according to Embodiment 1.
Figure 2D:
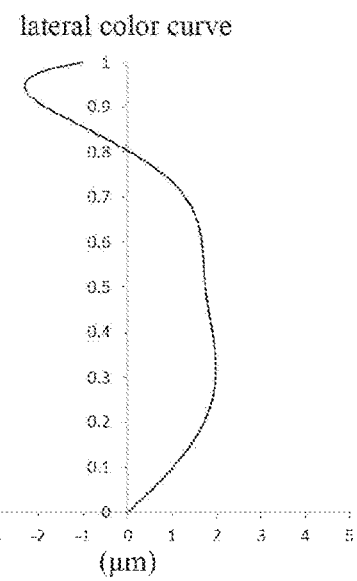
FIG. 2D illustrates a lateral color curve of the camera lens assembly according to Embodiment 1.

FIG. 2A shows a longitudinal aberration curve of the camera lens assembly according to Embodiment 1, representing deviations of focal points of light of different wavelengths converged after passing through an optical system. FIG. 2B shows an astigmatic curve of the camera lens assembly according to Embodiment 1, representing a curvature of a tangential image plane and a curvature of a sagittal image plane. FIG. 2C shows a relative illumination curve of the camera lens assembly according to Embodiment 1, representing the brightness of the image on the optical axis of the lens assembly, that is, the center of the screen. FIG. 2D shows a lateral color curve of the camera lens assembly according to Embodiment 1, representing deviations of different image heights on an image plane after light passes through the camera lens assembly. In summary, referring to FIG. 2A to FIG. 2D, it can be seen that the camera lens assembly according to Embodiment 1 may acquire a high-quality image effect in a situation of ensuring the miniaturization and the wide angle.

Embodiment 2

Embodiment 2 of the camera lens assembly of the present disclosure is described below with reference to FIG. 3 to FIG. 4D. In addition to the parameters of the lenses of the camera lens assembly, for example, in addition to the radius of curvature, the thickness, the material, the conic coefficient, the effective focal length, the axial spacing distance of each lens, the higher-order coefficients of each mirror surface, and the like, the camera lens assembly described in Embodiment 2 and the following embodiments is the same in arrangement and structure as that of the camera lens assembly described in Embodiment 1. For the purpose of brevity, the description of parts similar to those in Embodiment 1 will be omitted.

Figure 3:
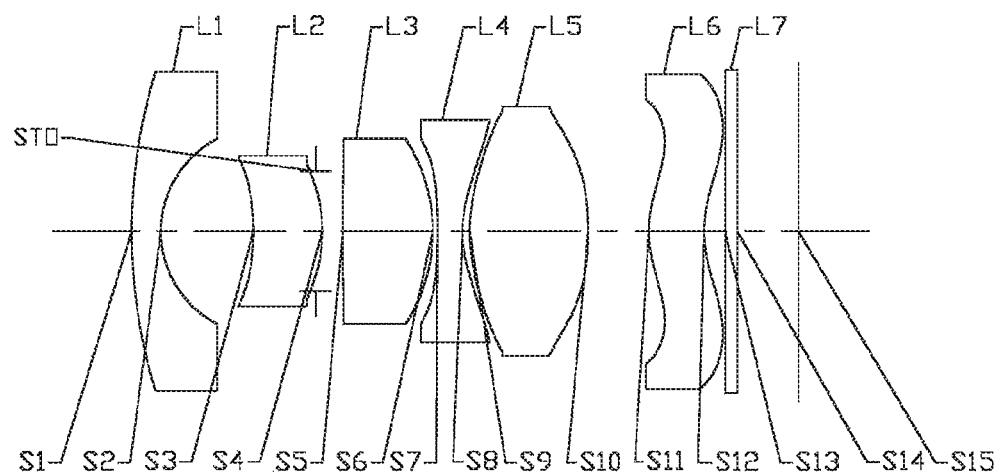
FIG. 3 is a schematic structural diagram illustrating a camera lens assembly according to Embodiment 2 of the present disclosure.

FIG. 3 shows a schematic structural diagram of the camera lens assembly according to Embodiment 2 of the present disclosure. As shown in FIG. 3, the camera lens assembly according to Embodiment 2 includes the first to sixth lenses L1-L6 respectively having an object-side surface and an image-side surface.

Table 4 below shows the effective focal lengths f1-f6 of the lenses, the total effective focal length f of the camera lens assembly, the half of the diagonal length ImgH of the effective pixel area of the electronic photosensitive element, the half of the maximal field-of-view HFOV of the camera lens assembly, the f-number Fno of the camera lens assembly and the total track length TTL of the camera lens assembly in Embodiment 2.

TABLE 4

| f(mm) | 3.557 | ImgH(mm) | 4.08 |
|---|---|---|---|
| f1(mm) | −6.498 | HFOV (deg) | 65.881 |
| f2(mm) | 11.146 | Fno | 2.018 |
| f3(mm) | 5.163 | TTL(mm) | 16.002 |
| f4(mm) | −3.750 | | |
| f5(mm) | 5.209 | | |
| f6(mm) | 28.659 | | |

Table 5 shows the surface type, the radius of curvature, the thickness, the material and the conic coefficient of each lens in Embodiment 2.

Table 6 shows the higher-order coefficients $A_4$, $A_6$, $A_8$, $A_{10}$, $A_{12}$, $A_{14}$ and $A_{16}$ applicable to aspheric surfaces of S1-S12 of the lenses in Embodiment 2.

TABLE 5

| surface number | surface type | radius of curvature | thickness | material | conic coefficient |
|---|---|---|---|---|---|
| OBJ | spherical | infinite | infinite | | |
| S1 | spherical | 13.1802 | 0.7000 | 1.489/70.42 | |
| S2 | spherical | 2.5147 | 2.2235 | | |
| S3 | aspheric | −5.8102 | 1.6513 | 1.668/20.37 | 3.8118 |
| S4 | aspheric | −3.6307 | −0.1590 | | −0.6212 |
| STO | spherical | infinite | 0.6491 | | |
| S5 | spherical | 61.3623 | 2.1634 | 1.758/52.33 | |
| S6 | spherical | −4.1141 | 0.1107 | | |
| S7 | aspheric | −52.9368 | 0.6000 | 1.668/20.37 | −99.0000 |
| S8 | aspheric | 2.6345 | 0.1719 | | −6.0959 |
| S9 | aspheric | 3.8794 | 2.8467 | 1.547/56.11 | −8.0499 |
| S10 | aspheric | −7.8935 | 1.4587 | | 2.9231 |
| S11 | aspheric | 2.8469 | 1.3215 | 1.547/56.11 | −4.3452 |
| S12 | aspheric | 2.9096 | 0.5000 | | −1.1118 |
| S13 | spherical | infinite | 0.3000 | 1.517/64.17 | |
| S14 | spherical | infinite | 1.4641 | | |
| S15 | spherical | infinite | | | |

TABLE 6

| surface number | A4 | A6 | A8 | A10 | A12 | A14 | A16 |
|---|---|---|---|---|---|---|---|
| S3 | −4.1717E−03 | 7.5018E−06 | 2.3691E−04 | −3.2480E−04 | 1.8816E−04 | −5.0032E−05 | 5.1875E−06 |
| S4 | −1.1996E−03 | 1.2252E−03 | −1.9672E−03 | 1.5526E−03 | −6.4411E−04 | 1.3050E−04 | −9.5345E−06 |
| S7 | −2.9121E−02 | 8.9179E−03 | −2.7142E−03 | 5.3480E−04 | −6.2643E−05 | 3.7348E−06 | −9.0881E−08 |
| S8 | −1.1134E−02 | 6.5152E−03 | −2.2370E−03 | 4.5095E−04 | −5.4189E−05 | 3.5621E−06 | −9.9638E−08 |
| S9 | −4.2761E−03 | 3.5844E−03 | −1.0974E−03 | 1.9213E−04 | −1.9485E−05 | 1.0826E−06 | −2.5416E−08 |
| S10 | −1.5637E−02 | 3.4540E−03 | −6.5921E−04 | 1.0146E−04 | −1.0192E−05 | 5.9330E−07 | −1.3639E−08 |
| S11 | −5.5243E−03 | −2.0407E−03 | 1.8458E−04 | 3.2682E−05 | −8.7641E−06 | 7.6427E−07 | −2.5241E−08 |
| S12 | −1.7253E−02 | −7.7323E−04 | 3.6199E−04 | −4.6957E−05 | 3.3303E−06 | −1.2908E−07 | 2.0526E−09 |

Figure 4A:
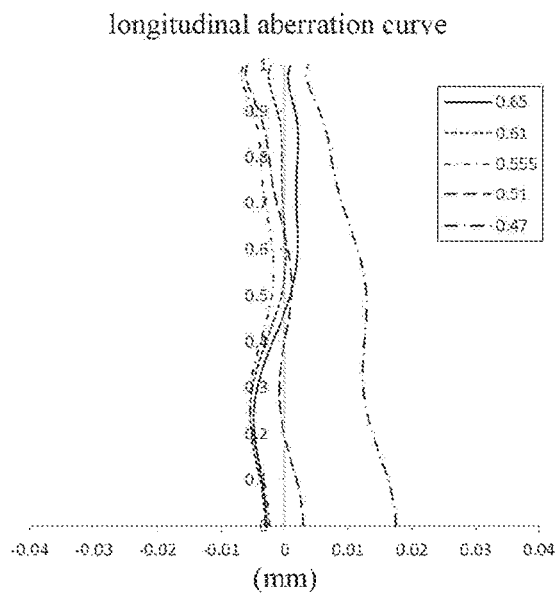
FIG. 4A illustrates a longitudinal aberration curve of the camera lens assembly according to Embodiment 2.
Figure 4B:
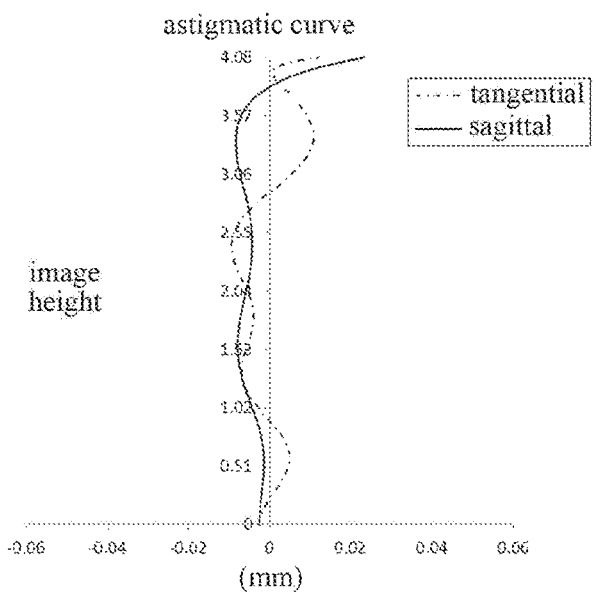
FIG. 4B illustrates an astigmatic curve of the camera lens assembly according to Embodiment 2.
Figure 4C:
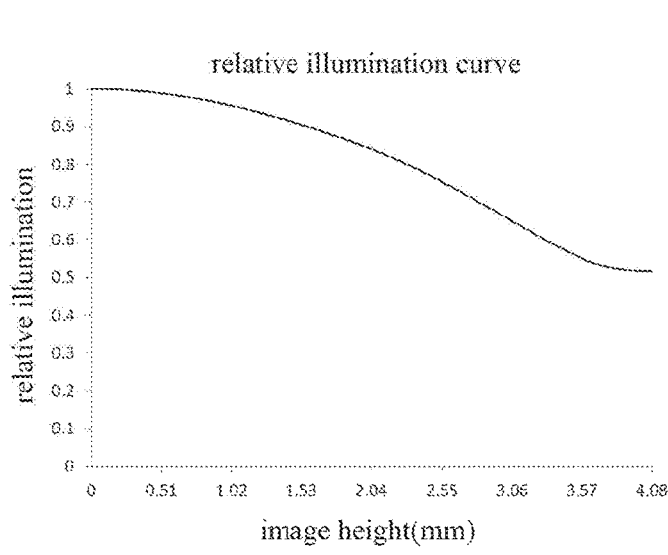
FIG. 4C illustrates a relative illumination curve of the camera lens assembly according to Embodiment 2.
Figure 4D:
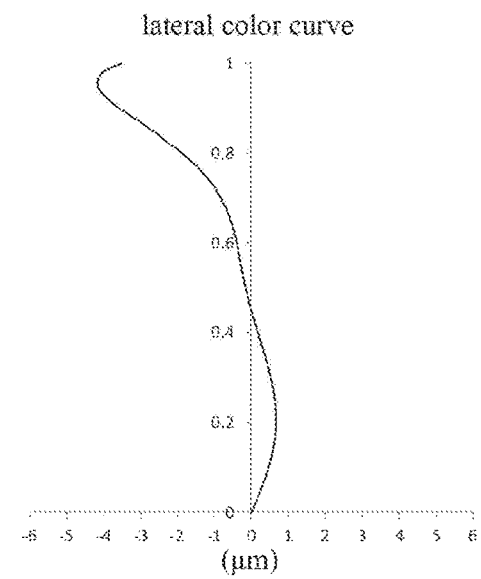
FIG. 4D illustrates a lateral color curve of the camera lens assembly according to Embodiment 2.

FIG. 4A shows a longitudinal aberration curve of the camera lens assembly according to Embodiment 2 representing deviations of focal points of light of different wavelengths converged after passing through an optical system. FIG. 4B shows an astigmatic curve of the camera lens assembly according to Embodiment 2, representing a curvature of a tangential image plane and a curvature of a sagittal image plane. FIG. 4C shows a relative illumination curve of the camera lens assembly according to Embodiment 2, representing the brightness of the image on the optical axis of the lens assembly, that is, the center of the screen. FIG. 4D shows a lateral color curve of the camera lens assembly according to Embodiment 2, representing deviations of different image heights on an image plane after light passes through the camera lens assembly. In summary, referring to FIG. 4A to FIG. 4D, it can be seen that the camera lens assembly according to Embodiment 2 may acquire a high-quality image effect in a situation of ensuring the miniaturization and the wide angle.

Embodiment 3

Figure 5:
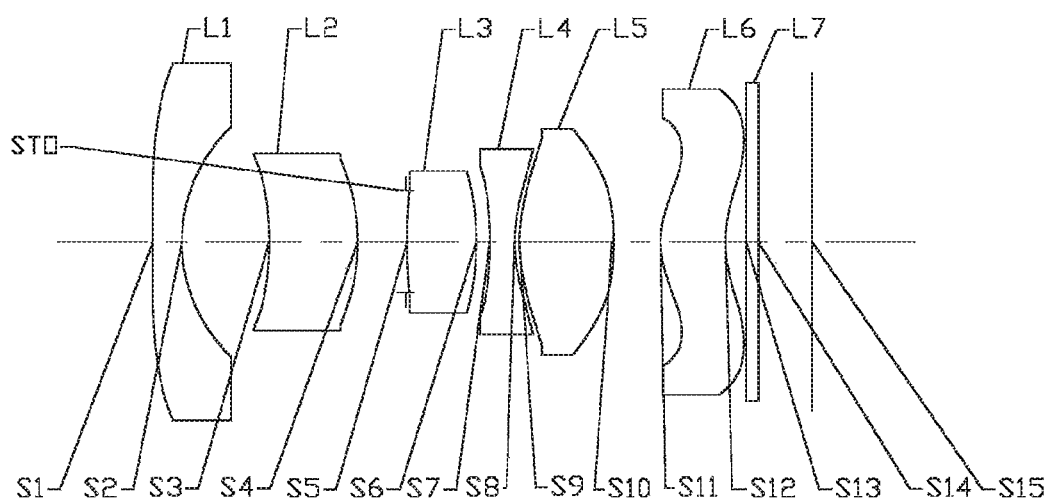
FIG. 5 is a schematic structural diagram illustrating a camera lens assembly according to Embodiment 3 of the present disclosure.

Embodiment 3 of the camera lens assembly of the present disclosure is described below with reference to FIG. 5 to FIG. 6D. FIG. 5 shows a schematic structural diagram of the camera lens assembly according to Embodiment 3 of the present disclosure. As shown in FIG. 5, the camera lens assembly according to Embodiment 3 includes the first to sixth lenses L1-L6 respectively having an object-side surface and an image-side surface.

Table 7 below shows the effective focal lengths f1-f6 of the lenses, the total effective focal length f of the camera lens assembly, the half of the diagonal length ImgH of the effective pixel area of the electronic photosensitive element, the half of the maximal field-of-view HFOV of the camera lens assembly, the f-number Fno of the camera lens assembly and the total track length TTL of the camera lens assembly in Embodiment 3.

TABLE 7

| f(mm) | 2.966 | ImgH(mm) | 4.08 |
|---|---|---|---|
| f1(mm) | −6.808 | HFOV (deg) | 61.633 |
| f2(mm) | 14.342 | Fno | 2.023 |
| f3(mm) | 6.039 | TTL(mm) | 16.008 |
| f4(mm) | −4.027 | | |
| f5(mm) | 5.285 | | |
| f6(mm) | 8.769 | | |

Table 8 shows the surface type, the radius of curvature, the thickness, the material and the conic coefficient of each lens in Embodiment 3.

TABLE 8

| surface number | surface type | radius of curvature | thickness | material | conic coefficient |
|---|---|---|---|---|---|
| OBJ | spherical | infinite | infinite | | |
| S1 | aspheric | −105.3403 | 0.7000 | 1.547/56.11 | −73.9054 |
| S2 | aspheric | 3.8619 | 2.1204 | | 0.1024 |
| S3 | aspheric | −8.7111 | 2.1538 | 1.668/20.37 | 5.0000 |
| S4 | aspheric | −5.0082 | 1.1662 | | −0.4033 |
| STO | spherical | infinite | 0.0300 | | |
| S5 | spherical | 13.0715 | 1.6839 | 1.758/52.33 | |
| S6 | spherical | −6.6487 | 0.3257 | | |
| S7 | aspheric | −14.3842 | 0.6000 | 1.668/20.37 | 0.0306 |
| S8 | aspheric | 3.3544 | 0.1223 | | −6.6779 |
| S9 | aspheric | 3.9348 | 2.2883 | 1.547/56.11 | −8.2972 |
| S10 | aspheric | −8.5977 | 1.1386 | | 4.9590 |
| S11 | aspheric | 2.2880 | 1.5734 | 1.547/56.11 | −3.6593 |
| S12 | aspheric | 3.3184 | 0.5000 | | −3.6047 |
| S13 | spherical | infinite | 0.3000 | 1.517/64.17 | |
| S14 | spherical | infinite | 1.3060 | | |
| S15 | spherical | infinite | | | |

Table 9 shows the higher-order coefficients $A_4$, $A_6$, $A_8$, $A_{10}$, $A_{12}$, $A_{14}$ and $A_{16}$ applicable to aspheric surfaces of S1-S12 of the lenses in Embodiment 3.

TABLE 9

| surface number | A4 | A6 | A8 | A10 | A12 | A14 | A16 |
|---|---|---|---|---|---|---|---|
| S1 | 2.6712E−03 | −6.7759E−05 | −1.6406E−06 | 1.2563E−07 | −2.5548E−10 | 0.0000E+00 | 0.0000E+00 |
| S2 | −3.7972E−04 | −1.1845E−04 | 1.3412E−04 | −2.8417E−05 | 1.6645E−06 | 0.0000E+00 | 0.0000E+00 |
| S3 | −6.9807E−03 | 1.7455E−03 | −8.4728E−04 | 2.9996E−04 | −6.3998E−05 | 7.3814E−06 | −3.5153E−07 |
| S4 | −1.7250E−03 | 7.4300E−04 | −2.9141E−04 | 7.0964E−05 | −1.0265E−05 | 8.2144E−07 | −2.7247E−08 |
| S7 | −1.4692E−02 | 7.6947E−04 | 4.7956E−04 | −1.8403E−04 | 2.9110E−05 | −1.5401E−06 | −1.8030E−08 |
| S8 | −5.3466E−03 | 8.2075E−04 | −4.1073E−05 | −1.4125E−05 | 2.9469E−06 | −2.1692E−07 | 5.6236E−09 |
| S9 | −5.7421E−04 | 4.8724E−04 | −1.2058E−04 | 1.6966E−05 | −1.3126E−06 | 5.2490E−08 | −8.4429E−10 |
| S10 | −2.8327E−02 | 6.3257E−03 | −1.0976E−03 | 1.5434E−04 | −1.4744E−05 | 8.3556E−07 | −2.0210E−08 |
| S11 | 3.1549E−03 | −4.4061E−03 | 3.5084E−04 | 2.5528E−05 | −5.2572E−06 | 1.6475E−07 | 1.5886E−09 |
| S12 | 1.0117E−02 | −8.3674E−03 | 1.6025E−03 | −1.5662E−04 | 8.2646E−06 | −2.2676E−07 | 2.5424E−09 |

Figure 6A:
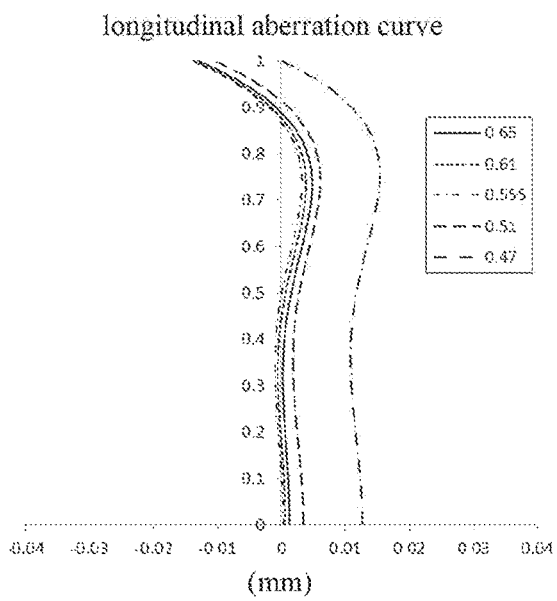
FIG. 6A illustrates a longitudinal aberration curve of the camera lens assembly according to Embodiment 3.
Figure 6B:
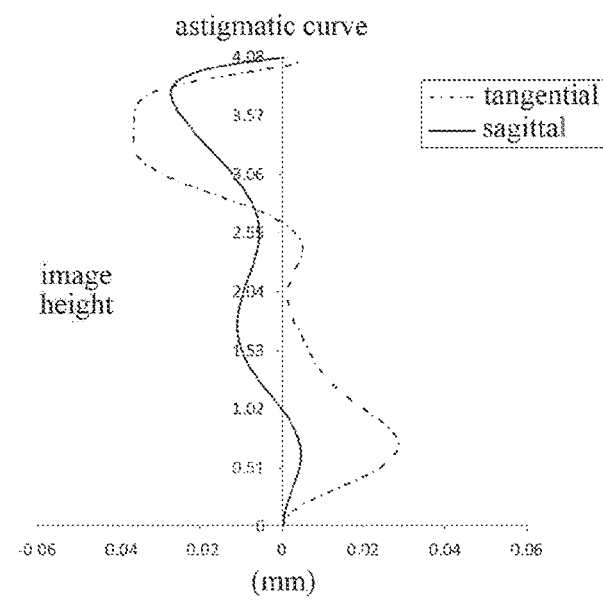
FIG. 6B illustrates an astigmatic curve of the camera lens assembly according to Embodiment 3.
Figure 6C:
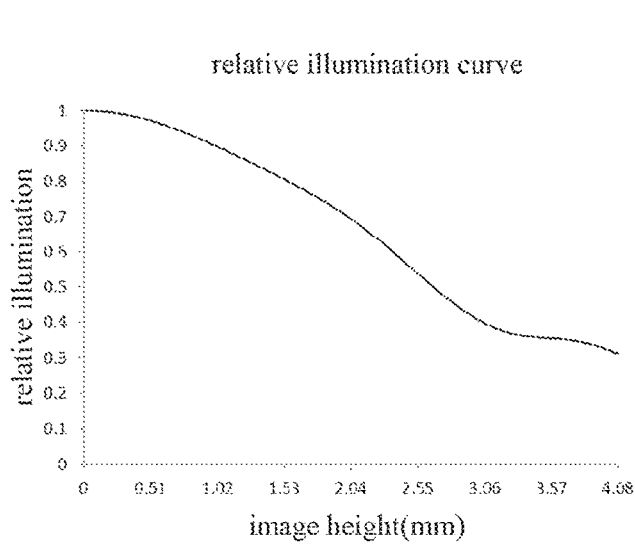
FIG. 6C illustrates a relative illumination curve of the camera lens assembly according to Embodiment 3.
Figure 6D:
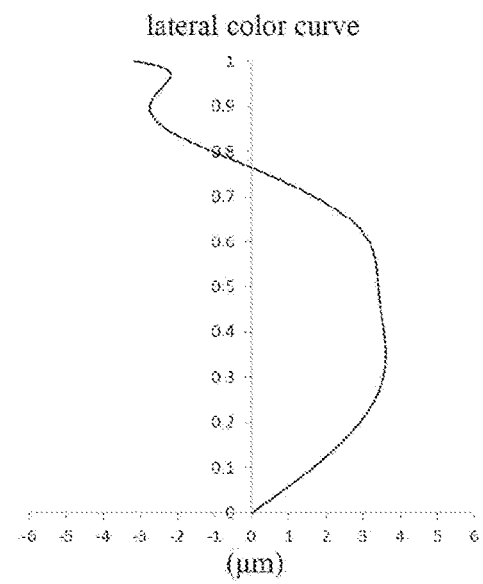
FIG. 6D illustrates a lateral color curve of the camera lens assembly according to Embodiment 3.

FIG. 6A shows a longitudinal aberration curve of the camera lens assembly according to Embodiment 3, representing deviations of focal points of light of different wavelengths converged after passing through an optical system. FIG. 6B shows an astigmatic curve of the camera lens assembly according to Embodiment 3, representing a curvature of a tangential image plane and a curvature of a sagittal image plane. FIG. 6C shows a relative illumination curve of the camera lens assembly according to Embodiment 3, representing the brightness of the image on the optical axis of the lens assembly, that is, the center of the screen. FIG. 6D shows a lateral color curve of the camera lens assembly according to Embodiment 3, representing deviations of different image heights on an image plane after light passes through the camera lens assembly. In summary, referring to FIG. 6A to FIG. 6D, it can be seen that the camera lens assembly according to Embodiment 3 may acquire a high-quality image effect in a situation of ensuring the miniaturization and the wide angle.

Embodiment 4

Figure 7:
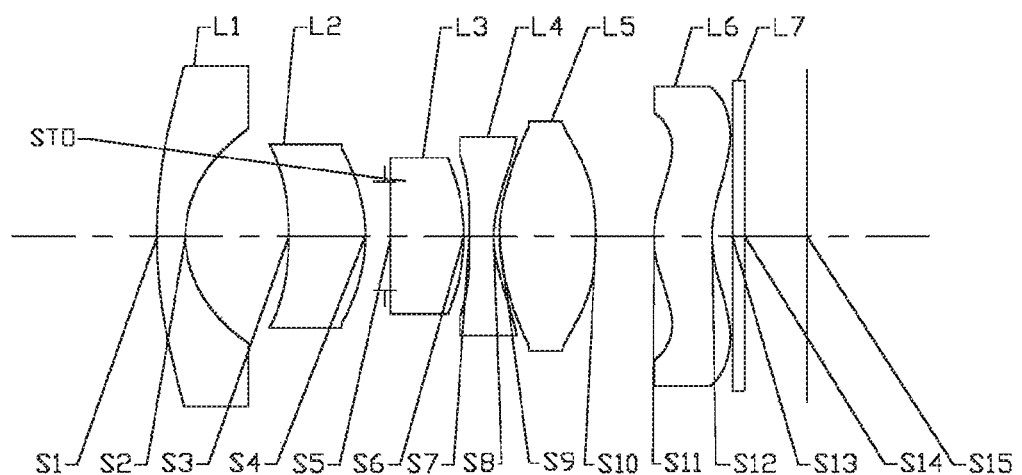
FIG. 7 is a schematic structural diagram illustrating a camera lens assembly according to Embodiment 4 of the present disclosure.

Embodiment 4 of the camera lens assembly of the present disclosure is described below with reference to FIG. 7 to FIG. 8D. FIG. 7 shows a schematic structural diagram of the camera lens assembly according to Embodiment 4 of the present disclosure. As shown in FIG. 7, the camera lens assembly according to Embodiment 4 includes the first to sixth lenses L1-L6 respectively having an object-side surface and an image-side surface.

Table 11 shows the surface type, the radius of curvature, the thickness, the material and the conic coefficient of each lens in this Embodiment 4.

TABLE 11

| surface number | surface type | radius of curvature | thickness | material | conic coefficient |
|---|---|---|---|---|---|
| OBJ | spherical | infinite | infinite | | |
| S1 | aspheric | 13.8394 | 0.7000 | 1.547/56.11 | 0.6307 |
| S2 | aspheric | 2.8247 | 2.5433 | | −0.0562 |
| S3 | aspheric | −7.7111 | 1.8894 | 1.668/20.37 | 4.1584 |
| S4 | aspheric | −4.0171 | 0.4765 | | −0.8460 |
| STO | spherical | infinite | 0.1469 | | |
| S5 | spherical | 2355.0630 | 1.8012 | 1.758/52.33 | |
| S6 | spherical | −4.8908 | 0.1349 | | |
| S7 | aspheric | −77.3084 | 0.6000 | 1.668/20.37 | −99.0000 |
| S8 | aspheric | 2.5701 | 0.1359 | | −6.5821 |
| S9 | aspheric | 3.3513 | 2.3856 | 1.547/56.11 | −8.1262 |
| S10 | aspheric | −7.8229 | 1.4335 | | 1.7201 |
| S11 | aspheric | 2.6391 | 1.4269 | 1.547/56.11 | −3.4683 |
| S12 | aspheric | 3.1889 | 0.5000 | | −1.2939 |
| S13 | spherical | infinite | 0.3000 | 1.517/64.17 | |
| S14 | spherical | infinite | 1.5352 | | |
| S15 | spherical | infinite | | | |

Table 12 shows the higher-order coefficients $A_4$, $A_6$, $A_8$, $A_{10}$, $A_{12}$, $A_{14}$ and $A_{16}$ applicable to aspheric surfaces of S1-S12 of the lenses in Embodiment 4.

TABLE 12

| surface number | A4 | A6 | A8 | A10 | A12 | A14 |
|---|---|---|---|---|---|---|
| S1 | 8.5551E−04 | −2.6728E−05 | −5.8061E−06 | 3.7387E−07 | −6.5031E−09 | 0.0000E+00 |
| S2 | 6.6621E−04 | −5.0855E−04 | 1.7193E−04 | −4.0995E−05 | 1.8360E−06 | 0.0000E+00 |
| S3 | −4.2282E−03 | −8.1525E−05 | 3.0997E−05 | 4.2960E−06 | −7.2546E−07 | 0.0000E+00 |
| S4 | 1.5655E−04 | −1.5308E−04 | 8.4884E−05 | −1.9981E−05 | 1.5383E−06 | 0.0000E+00 |
| S7 | −2.4867E−02 | 7.0535E−03 | −1.7446E−03 | 2.3056E−04 | −1.1946E−05 | 0.0000E+00 |
| S8 | −7.2300E−03 | 3.0309E−03 | −7.3225E−04 | 8.1554E−05 | −3.8958E−06 | 0.0000E+00 |
| S9 | −1.7195E−03 | 1.4944E−03 | −2.9642E−04 | 3.0007E−05 | −1.1968E−06 | 0.0000E+00 |
| S10 | −1.8243E−02 | 3.5126E−03 | −5.2416E−04 | 5.2900E−05 | −1.8612E−06 | 0.0000E+00 |
| S11 | −4.2873E−03 | −1.9207E−03 | 8.8066E−05 | 1.3020E−05 | −1.2182E−06 | 0.0000E+00 |
| S12 | −9.3295E−03 | −2.0345E−03 | 3.9784E−04 | −3.1158E−05 | 1.1485E−06 | −1.7735E−08 |

Table 10 below shows the effective focal lengths f1-f6 of the lenses, the total effective focal length f of the camera lens assembly, the half of the diagonal length ImgH of the effective pixel area of the electronic photosensitive element, the half of the maximal field-of-view HFOV of the camera lens assembly, the f-number Fno of the camera lens assembly and the total track length TTL of the camera lens assembly in Embodiment 4.

TABLE 10

| f(mm) | 3.221 | ImgH(mm) | 4.08 |
|---|---|---|---|
| f1(mm) | −6.650 | HFOV (deg) | 64.355 |
| f2(mm) | 10.446 | Fno | 2.030 |
| f3(mm) | 6.444 | TTL(mm) | 16.009 |
| f4(mm) | −3.721 | | |
| f5(mm) | 4.648 | | |
| f6(mm) | 14.629 | | |

Figure 8A:
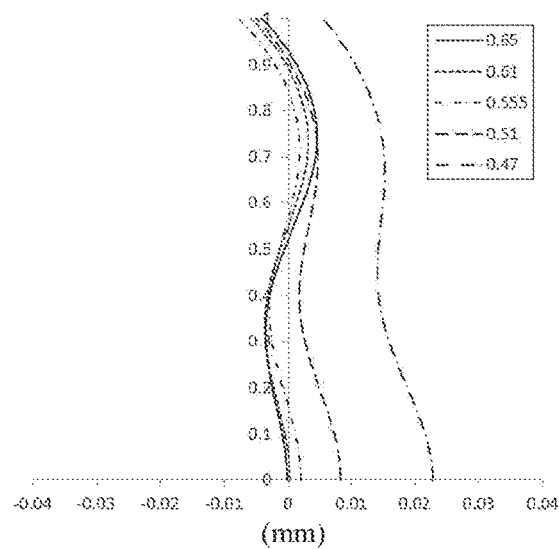
FIG. 8A illustrates a longitudinal aberration curve of the camera lens assembly according to Embodiment 4.
Figure 8B:
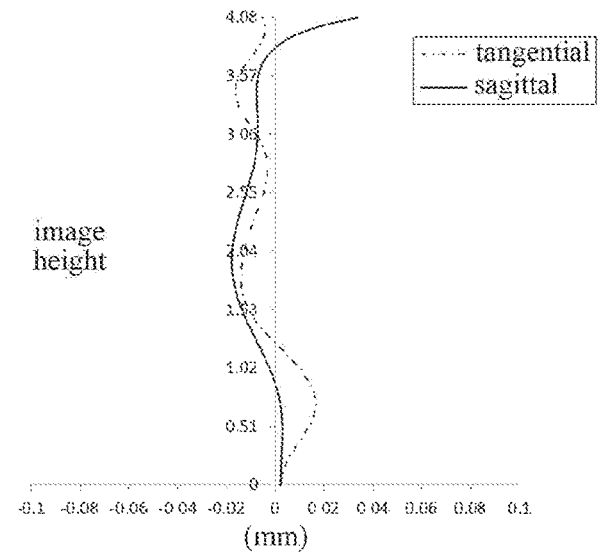
FIG. 8B illustrates an astigmatic curve of the camera lens assembly according to Embodiment 4.
Figure 8C:
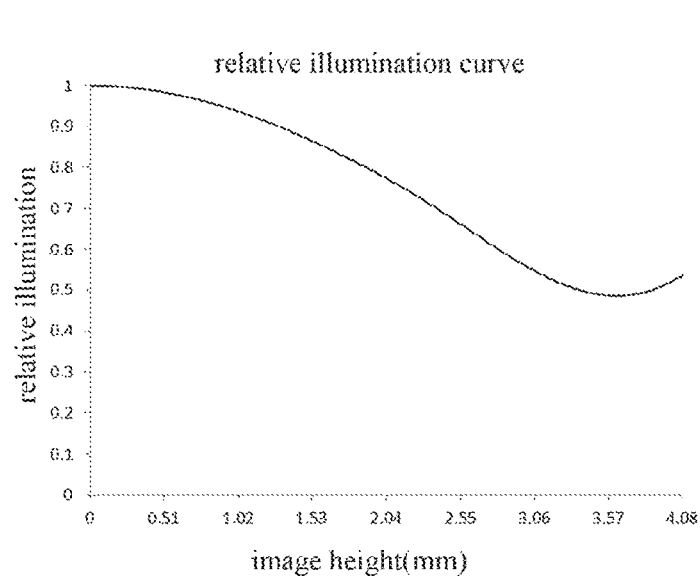
FIG. 8C illustrates a relative illumination curve of the camera lens assembly according to Embodiment 4.
Figure 8D:
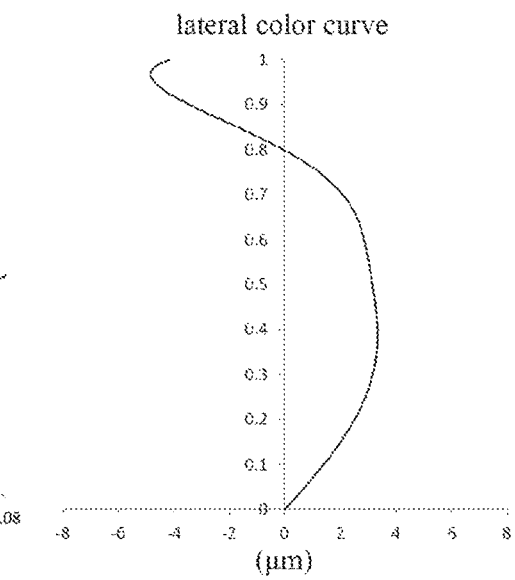
FIG. 8D illustrates a lateral color curve of the camera lens assembly according to Embodiment 4.

FIG. 8A shows a longitudinal aberration curve of the camera lens assembly according to Embodiment 4 representing deviations of focal points of light of different wavelengths converged after passing through an optical system. FIG. 4B shows an astigmatic curve of the camera lens assembly according to Embodiment 4, representing a curvature of a tangential image plane and a curvature of a sagittal image plane. FIG. 8C shows a relative illumination curve of the camera lens assembly according to Embodiment 4, representing the brightness of the image on the optical axis of the lens assembly, that is, the center of the screen. FIG. 8D shows a lateral color curve of the camera lens assembly according to Embodiment 4, representing deviations of different image heights on an image plane after light passes through the camera lens assembly. In summary, referring to FIG. 8A to FIG. 8D, it can be seen that the camera lens assembly according to Embodiment 4 may acquire a high-quality image effect in a situation of ensuring the miniaturization and the wide angle.

Embodiment 5

Figure 9:
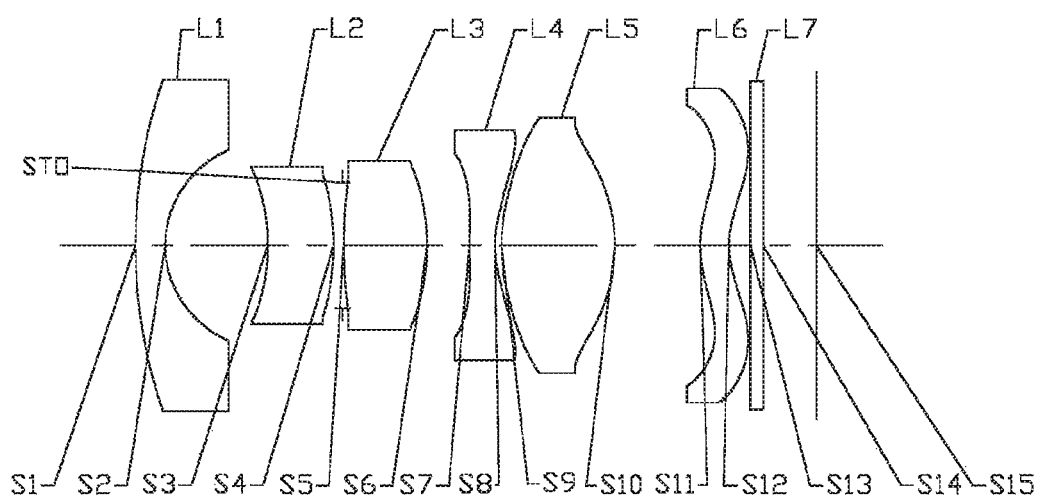
FIG. 9 is a schematic structural diagram illustrating a camera lens assembly according to Embodiment 5 of the present disclosure.

Embodiment 5 of the camera lens assembly of the present disclosure is described below with reference to FIG. 9 to FIG. 10D. FIG. 9 shows a schematic structural diagram of the camera lens assembly according to Embodiment 5 of the present disclosure. As shown in FIG. 9, the camera lens assembly according to Embodiment 5 includes the first to sixth lenses L1-L6 respectively having an object-side surface and an image-side surface.

Table 13 below shows the effective focal lengths f1-f6 of the lenses, the total effective focal length f of the camera lens assembly, the half of the diagonal length ImgH of the effective pixel area of the electronic photosensitive element, the half of the maximal field-of-view HFOV of the camera lens assembly, the f-number Fno of the camera lens assembly and the total track length TTL of the camera lens assembly in Embodiment 5.

TABLE 13

| f(mm) | 3.518 | ImgH(mm) | 4.08 |
|---|---|---|---|
| f1(mm) | −6.424 | HFOV (deg) | 63.940 |
| f2(mm) | −1544.130 | Fno | 2.066 |
| f3(mm) | 5.049 | TTL(mm) | 16.005 |
| f4(mm) | −4.484 | | |

TABLE 13-continued

| f5(mm) | 4.169 |
|---|---|
| f6(mm) | −69.983 |

Table 14 shows the surface type, the radius of curvature, the thickness, the material and the conic coefficient of each lens in this Embodiment 5.

TABLE 14

| surface number | surface type | radius of curvature | thickness | material | conic coefficient |
|---|---|---|---|---|---|
| OBJ | spherical | infinite | infinite | | |
| S1 | spherical | 12.2698 | 0.7000 | 1.489/70.42 | |
| S2 | spherical | 2.4531 | 2.4040 | | |
| S3 | aspheric | −5.2988 | 1.5522 | 1.668/20.37 | 2.7442 |
| S4 | aspheric | −5.9502 | 0.2092 | | −0.4869 |
| STO | spherical | infinite | 0.0300 | | |
| S5 | spherical | 12.6515 | 1.9619 | 1.758/52.33 | |
| S6 | spherical | −5.1163 | 0.9914 | | |
| S7 | aspheric | 18.0280 | 0.6000 | 1.668/20.37 | −9.90E+01 |
| S8 | aspheric | 2.5291 | 0.1540 | | −8.4099 |
| S9 | aspheric | 3.9826 | 2.6645 | 1.547/56.11 | −16.4075 |
| S10 | aspheric | −4.0570 | 2.0048 | | −0.9379 |
| S11 | aspheric | 2.8034 | 0.6826 | 1.547/56.11 | −5.7210 |
| S12 | aspheric | 2.3872 | 0.5000 | | −1.1926 |
| S13 | spherical | infinite | 0.3000 | 1.517/64.17 | |
| S14 | spherical | infinite | 1.2500 | | |
| S15 | spherical | infinite | | | |

Table 15 shows the higher-order coefficients $A_4$, $A_6$, $A_8$, $A_{10}$, $A_{12}$, $A_{14}$ and $A_{16}$ applicable to aspheric surfaces of S1-S12 of the lenses in Embodiment 5.

TABLE 15

| surface number | A4 | A6 | A8 | A10 | A12 | A14 | A16 |
|---|---|---|---|---|---|---|---|
| S3 | −1.3285E−03 | −6.9612E−04 | 7.9467E−04 | −4.6332E−04 | 1.5093E−04 | −2.6717E−05 | 2.0698E−06 |
| S4 | −1.5083E−03 | −3.5127E−04 | 3.7899E−04 | −1.3643E−04 | 2.7224E−06 | 8.7468E−06 | −1.2407E−06 |
| S7 | −3.8968E−02 | 1.3364E−02 | −5.2252E−03 | 1.5132E−03 | −2.9846E−04 | 3.5078E−05 | −1.8441E−06 |
| S8 | −6.5997E−03 | 2.9776E−03 | −1.1488E−03 | 2.4846E−04 | −3.2861E−05 | 2.3950E−06 | −7.5970E−08 |
| S9 | 6.6963E−03 | −1.3068E−04 | −3.1786E−04 | 9.4493E−05 | −1.2400E−05 | 8.2885E−07 | −2.2940E−08 |
| S10 | −4.9897E−03 | 9.5441E−04 | −1.2380E−04 | 1.6287E−05 | −1.3559E−06 | 2.0053E−07 | −1.1390E−08 |
| S11 | −1.4996E−04 | −5.7729E−03 | 1.3598E−03 | −1.7567E−04 | 1.2481E−05 | −4.0183E−07 | 2.1835E−09 |
| S12 | −2.7704E−02 | 3.1640E−04 | 3.9392E−04 | −7.5556E−05 | 7.0332E−06 | −3.2703E−07 | 5.8644E−09 |

Figure 10A:
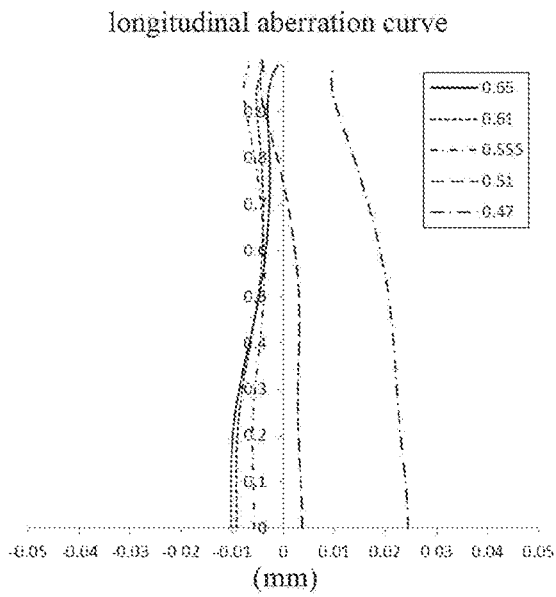
FIG. 10A illustrates a longitudinal aberration curve of the camera lens assembly according to Embodiment 5.
Figure 10B:
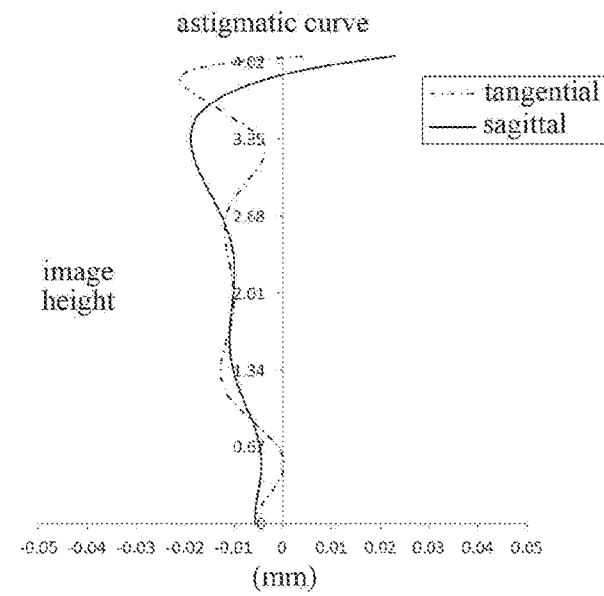
FIG. 10B illustrates an astigmatic curve of the camera lens assembly according to Embodiment 5.
Figure 10C:
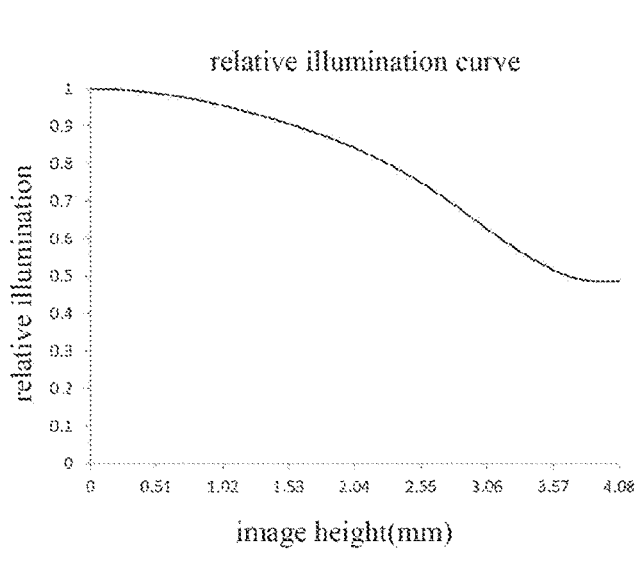
FIG. 10C illustrates a relative illumination curve of the camera lens assembly according to Embodiment 5.
Figure 10D:
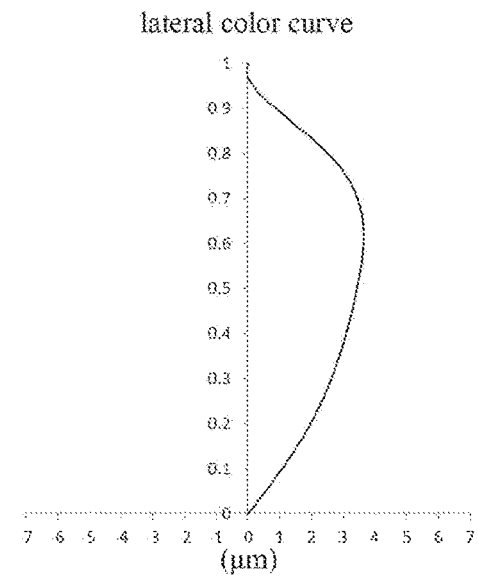
FIG. 10D illustrates a lateral color curve of the camera lens assembly according to Embodiment 5.

FIG. 10A shows a longitudinal aberration curve of the camera lens assembly according to Embodiment 5, representing deviations of focal points of light of different wavelengths converged after passing through an optical system. FIG. 10B shows an astigmatic curve of the camera lens assembly according to Embodiment 5, representing a curvature of a tangential image plane and a curvature of a sagittal image plane. FIG. 10C shows a relative illumination curve of the camera lens assembly according to Embodiment 5, representing the brightness of the image on the optical axis of the lens assembly, that is, the center of the screen. FIG. 10D shows a lateral color curve of the camera lens assembly according to Embodiment 5, representing deviations of different image heights on an image plane after light passes through the camera lens assembly. In summary, referring to FIG. 10A to FIG. 10D, it can be seen that the camera lens assembly according to Embodiment 5 may acquire a high-quality image effect in a situation of ensuring the miniaturization and the wide angle.

To sum up, referring to Table 1 to Table 15, the parameters of Embodiment 1 to Embodiment 5 respectively satisfy the relationships shown in Table 16 below.

TABLE 16

| Conditional expression | Embodiment | | | | |
|---|---|---|---|---|---|
| | 1 | 2 | 3 | 4 | 5 |
| f1/f4 | 1.625 | 1.733 | 1.691 | 1.787 | 1.433 |
| \|dn/dt\| | 1.19E−06 | 1.19E−06 | 1.19E−06 | 1.19E−06 | 1.19E−06 |
| tan(HFOV)*f(mm) | 8.061 | 7.945 | 5.493 | 6.710 | 7.195 |
| CRAmax(°) | 20.003 | 15.947 | 17.564 | 20.003 | 18.278 |
| CT4/CT5 | 0.210 | 0.211 | 0.262 | 0.252 | 0.225 |
| DT11/DT62 | 0.959 | 1.014 | 1.167 | 1.137 | 1.055 |
| (CT2 + CT5)/TTL | 0.278 | 0.281 | 0.277 | 0.267 | 0.263 |
| T12/T56 | 1.343 | 1.524 | 1.862 | 1.774 | 1.199 |
| DT21/DT42 | 0.632 | 0.676 | 0.953 | 0.924 | 0.686 |
| R2/R11 | 0.939 | 0.883 | 1.688 | 1.070 | 0.875 |
| (T23 + T34 + T45)/TTL | 0.051 | 0.048 | 0.103 | 0.056 | 0.087 |
| DT62/ImgH | 3.382 | 3.305 | 2.703 | 2.919 | 3.205 |

In addition, the present disclosure further provides a camera device, having a photosensitive element which may be a photosensitive charge-coupled device (CCD) or a complementary metal-oxide semiconductor (CMOS) element. The camera device may be an independent camera device such as a digital camera, or may be a camera module integrated in a mobile electronic device such as a mobile phone. The camera device is equipped with the camera lens assembly as described above in the embodiments.

The exemplary embodiments of the present disclosure have been described above with reference to the accompanying drawings. It should be understood by those skilled in the art that the above embodiments are merely examples for illustrative purposes, rather than a limitation to the scope of the present disclosure. Any modifications, equivalent replacements, etc. made within the teachings of the present disclosure and the scope of protection of the claims shall be included within the scope of protection of the present disclosure.

What is claimed is:

1. A camera lens assembly comprising sequentially, from an object side to an image side along an optical axis, a first lens, a second lens, a third lens, a fourth lens, and at least one subsequent lens,
    wherein the first lens has a negative refractive power, and an image-side surface of the first lens is a concave surface;
    an image-side surface of the second lens is a convex surface;
    the fourth lens has a negative refractive power; and
    an effective radius DT21 of an object-side surface of the second lens and an effective radius DT42 of an image-side surface of the fourth lens satisfy: 0.5<DT21/DT42<1.

2. The camera lens assembly according to claim 1, wherein the at least one subsequent lens comprises a fifth lens, the fifth lens is disposed on the image-side surface of the fourth lens along the optical axis, and
    a center thickness CT4 of the fourth lens on the optical axis and a center thickness CT5 of the fifth lens on the optical axis satisfy: CT4/CT5<0.5.

3. The camera lens assembly according to claim 2, wherein the at least one subsequent lens further comprises a sixth lens, the sixth lens is disposed on an image-side surface of the fifth lens along the optical axis, and
    an effective radius DT11 of an object-side surface of the first lens and an effective radius DT62 of an image-side surface of the sixth lens satisfy: 0.8<DT11/DT62<1.3.

4. The camera lens assembly according to claim 3, wherein the effective radius DT62 of the image-side surface of the sixth lens and half of a diagonal length ImgH of an effective pixel area of an electronic photosensitive element satisfy: 2.5<DT62/ImgH<3.5.

5. The camera lens assembly according to claim 3, wherein a radius of curvature R2 of the image-side surface of the first lens and a radius of curvature R11 of an object-side surface of the sixth lens satisfy: 0.8<R2/R11<1.8.

6. The camera lens assembly according to claim 2, wherein a center thickness CT2 of the second lens on the optical axis, the center thickness CT5 of the fifth lens on the optical axis and an axial distance TTL from an object-side surface of the first lens to an image plane of the camera lens assembly satisfy: (CT2+CT5)/TTL<0.4.

7. The camera lens assembly according to claim 2, wherein an axial spacing distance T23 between the second lens and the third lens, an axial spacing distance T34 between the third lens and the fourth lens, an axial spacing distance T45 between the fourth lens and the fifth lens and an axial distance TTL from an object-side surface of the first lens to an image plane satisfy: 0.04<(T23+T34+T45)/TTL<0.12.

8. The camera lens assembly according to claim 1, wherein a material of the third lens is glass, and an influencing rate of a unit temperature of the third lens to a unit refractive index of the third lens satisfies: $|dn3/dt|<10^{-5}$,
    wherein a refractive index of the third lens is n3, and a temperature of the third lens is t.

9. The camera lens assembly according to claim 1, wherein an effective focal length f1 of the first lens and an effective focal length f4 of the fourth lens satisfy: 1<f1/f4<1.8.

10. The camera lens assembly according to claim 1, wherein half of a maximal field-of-view HFOV of the camera lens assembly and a total effective focal length f of the camera lens assembly satisfy: 5.4 mm<tan(HFOV)*f<10 mm.

11. A camera device, comprising the camera lens assembly according to claim 1.

12. A camera lens assembly comprising sequentially, from an object side to an image side along an optical axis, a first lens, a second lens, a third lens, a fourth lens, a fifth lens, and a sixth lens,
    wherein the first lens has a negative refractive power, and an image-side surface of the first lens is a concave surface;
    an image-side surface of the second lens is a convex surface;
    the fourth lens has a negative refractive power; and
    an effective radius DT11 of an object-side surface of the first lens and an effective radius DT62 of an image-side surface of the sixth lens satisfy: 0.8<DT11/DT62<1.3, wherein a maximum angle CRAmax of an incident ray corresponding to an image height of the camera lens assembly on an electronic photosensitive assembly satisfies: CRAmax<21°.

13. The camera lens assembly according to claim 12, wherein an axial spacing distance T12 between the first lens and the second lens and an axial spacing distance T56 between the fifth lens and the sixth lens satisfy: 1.1<T12/T56<1.9.

14. A camera device, comprising the camera lens assembly according to claim 12.

15. The camera lens assembly according to claim 12, wherein a material of the third lens is glass, and an influencing rate of a unit temperature of the third lens to a unit refractive index of the third lens satisfies: |dn3/dt|<10$^{-5}$, wherein a refractive index of the third lens is n3, and a temperature of the third lens is t.

16. A camera lens assembly comprising sequentially, from an object side to an image side along an optical axis, a first lens, a second lens, a third lens, a fourth lens, a fifth lens, and a sixth lens,
wherein the first lens has a negative refractive power, and an image-side surface of the first lens is a concave surface;
an image-side surface of the second lens is a convex surface;
the fourth lens has a negative refractive power; and
an effective radius DT62 of an image-side surface of the sixth lens and half of a diagonal length ImgH of an effective pixel area of an electronic photosensitive element satisfy: 2.5<DT62/ImgH<3.5.

17. The camera lens assembly according to claim 16, wherein a material of the third lens is glass, and an influencing rate of a unit temperature of the third lens to a unit refractive index of the third lens satisfies: |dn3/dt|<10$^{-5}$, wherein a refractive index of the third lens is n3, and a temperature of the third lens is t.

18. The camera lens assembly according to claim 16, wherein an effective focal length f1 of the first lens and an effective focal length f4 of the fourth lens satisfy: 1<f1/f4<1.8.

19. The camera lens assembly according to claim 16, wherein half of a maximal field-of-view HFOV of the camera lens assembly and a total effective focal length f of the camera lens assembly satisfy: 5.4 mm<tan(HFOV)*f<10 mm.

20. The camera lens assembly according to claim 16, wherein an axial spacing distance T23 between the second lens and the third lens, an axial spacing distance T34 between the third lens and the fourth lens, an axial spacing distance T45 between the fourth lens and the fifth lens and an axial distance TTL from an object-side surface of the first lens to an image plane satisfy: 0.04<(T23+T34+T45)/TTL<0.12.

21. The camera lens assembly according to claim 16, wherein an axial spacing distance T12 between the first lens and the second lens and an axial spacing distance T56 between the fifth lens and the sixth lens satisfy: 1.1<T12/T56<1.9.

22. The camera lens assembly according to claim 16, wherein a radius of curvature R2 of the image-side surface of the first lens and a radius of curvature R11 of an object-side surface of the sixth lens satisfy: 0.8<R2/R11<1.8.

* * * * *